United States Patent [19]

Nirdosh et al.

[11] Patent Number: 4,654,200

[45] Date of Patent: Mar. 31, 1987

[54] PROCESSES FOR EXTRACTING RADIUM FROM URANIUM MILL TAILINGS

[76] Inventors: Inderjit Nirdosh, 494 Ryerson Crescent, Thunder Bay, Ontario, Canada, P7C 5R8; Malcolm H. Baird, 139 Old Ancaster Road, Dundas, Ontario, Canada, L9H 3R3; Sirugamani V. Muthuswami, 111 Clydesdale Drive, Willowdale, Ontario, Canada, M2J 3N3

[21] Appl. No.: 616,024

[22] Filed: Jun. 1, 1984

[51] Int. Cl.$^4$ .................... C01F 13/00; C01F 15/00
[52] U.S. Cl. ............................................................. 423/2
[58] Field of Search ............................ 423/2, 155, 157

[56] References Cited

U.S. PATENT DOCUMENTS

| | | | |
|---|---|---|---|
| 1,353,532 | 9/1920 | Hedström | 423/2 |
| 4,282,192 | 8/1981 | Larson | 423/2 |
| 4,374,096 | 2/1983 | Skeaff et al. | 423/2 |
| 4,431,609 | 2/1984 | Scheitlin | 423/2 |
| 4,454,097 | 6/1984 | Nirdosh et al. | 423/2 |

OTHER PUBLICATIONS

"Isolation of Ethylenediaminetetraacetic Acid from Solutions for Regeneration", S. K. Yagnik et al., *Hydrometallurgy*, vol. 7 pp. 67–75 (1981).
"Iron Oxide Removal from Soils and Clays by a Dithionite–Citrate System Buffered with Sodium Bicarbonate", pp. 317–327, *Clays and Clay Minerals*, vol. 7, 1960.
S. R. Borrowman & P. T. Brooks, U.S. Bureau of Mines Report of Investigations No. R18099 (1975).

*Primary Examiner*—John F. Terapane
*Assistant Examiner*—Susan Wolffe
*Attorney, Agent, or Firm*—Hirons, Rogers & Scott

[57] ABSTRACT

The removal of radium from acid-leached uranium mill tailings has been difficult due to its strong retention as mixed sulfates and in adsorbed forms. With this invention the leaching action of a complexing agent (reducing the free radium cation concentration in solution) is combined with that of a reducing agent. Thus, high valency metal hydroxides and basic salts (notably $Fe^{3+}$) which tend to retain radium are converted to the lower valency form which is much more soluble in the complexing agent. The reducing agent employed is sodium hydrosulfite, in combination with various organic complexing agents; the preferred complexing agent is EDTA. Over 90% of the radium in uranium leach tailings from Elliot Lake can be removed in 1 hour contact at room temperature with a solution comprising 0.04M of both sodium hydrosulfite and EDTA, with 1.0M potassium chloride added as a surface charge depressant. The gradual addition of the solids to liquid permits the use of low liquid/solid ratios.

6 Claims, No Drawings

PROCESSES FOR EXTRACTING RADIUM FROM URANIUM MILL TAILINGS

FIELD OF THE INVENTION

This invention is concerned with improvements in or relating to processes for extracting radium from uranium mill tailings.

REVIEW OF THE PRIOR ART

All the currently operating commercial uranium extraction processes yield mill tailings (solid wastes) which contain nearly all the radium initially present in the ore. This is because the currently used commercial uranium extraction processes employ either sulfuric acid or sodium carbonate for leaching uranium, and, since both radium sulfate and radium carbonate are insoluble, the radium precipitates as radium sulfate or radium carbonate and remains in the solid wastes. The radium content of the tailings is typically greater than 300 pCi radium per gram of the solid wastes, and many high grade uranium ores yield tailings with radium levels of nearly 2000 pCi radium per gram of the solids. These levels of radium in the tailings are so much higher than the generally recommended environmentally safe level of 20 pCi per gram of solids, that the uranium mill tailings have to be "managed" in perpetuity, unless the radium present in excess of the safe level is removed.

Many attempts have been reported for leaching radium from uranium mill tailings in order to reduce the radium levels in the tailings to the environmentally accepted safe levels, using as leachants, for example, inorganic salt solutions, mineral acids and organic complexing agents. The residues obtained after all these leaching attempts still contained radium levels in excess of 60 pCi radium per gram of solids unless leached at a liquid to solid ratio greater than 2 and in more than one leaching stage.

RECOVERY OF RADIUM BY EDTA

For example, in the Kellex Corporation/Vitro Corporation process, the solids containing the radium are treated with boiling 0.15M EDTA solution at pH 8-10 to dissolve the radium. The leachate is then acidified to a pH 5.8 and passed through cation exchange resin to remove the dissolved radium from the solution. After the resin has become loaded the radium is removed therefrom by eluting the resin bed with 0.15M EDTA solution at pH 10. This procedure is repeated 2-3 more times to purify the radium. Finally, the loaded resin bed is eluted with 6M nitric acid solution to bring the radium in solution, the solution is evaporated and radium is recovered.

In the Linde Air Products process, the radium containing solids are treated with 0.1M EDTA solution and the pH is adjusted to 6.3. The solution is passed through a resin bed and the radium removed from the leachate. Once the resin bed is loaded it is eluted with 0.23M EDTA solution at pH 11. The radium containing eluate is acidified with sulfuric acid to pH 4 and radium is removed by precipitation as a barium radium sulfate coprecipitate.

In a process for radium removal from uranium ores and mill tailings disclosed by S. R. Borrowman and P. T. Brooks in the U.S. Bureau of Mines Report of Investigations No. RI 8099 (1975) the uranium mill tailings from a sulfuric acid leach process were leached with 0.15M EDTA solution at 60° C. for 5 hours at a liquid/solids (L/S) ratio of 5.67 ml/g; only 80% of the radium was leached. When leaching was done at a L/S ratio of 1.87 ml/g, the EDTA solution was found ineffective for any radium leaching. It was only after 3 consecutive treatments at a L/S ratio of 5.67 ml/g that a total of 92% radium was extracted.

In an article entitled "An Investigation of Radium Extraction from Uranium Mill Tailings" by S. K. Yagnik, M. H. I. Baird and S. Banerjee, published in Hydrometallurgy Vol. 7, pages 61-75 (1981) sulfuric acid-leach uranium mill tailings were treated with a 0.3M EDTA solution at room temperature at a L/S ratio of 4.2 ml/g; only 40% radium extraction was obtained. Similarly, in an article entitled "Radium Removal from Elliot Lake Uranium Mill Solids by EDTA Leaching" by A. Nixon, D. Keller, K. Fritze, A. Pidruczny and A. Corsini in Hydrometallurgy Vol. 10, pages 173-186 (1983), sulfuric acid-leach uranium mill tailings were leached with 0.04M EDTA solution at room temperature. 60% Radium extraction was achieved at L/S ratio of 2 ml/g while the maximum appeared to be 80% radium extraction achieved at a L/S ratio toward infinity.

In a paper entitled "Isolation of Ethylenediamine Tetraacetic Acid from Solutions for Regeneration" by V. V. starostin; G. F. Silina and A. A. Lanin, translated from "Zhurnal Prikladnoi Khimii, Vol. 35 (1962) pages 1768-1772 of the English translation, the authors describe the employment of sodium hydrosulfite as a reducing agent in an EDTA solution containing ferric ions in order to facilitate EDTA recovery by reducing ferric ions to the ferrous state. A ferric-EDTA complex in solution is found to be extremely stable, to the extent that it is not broken even if the pH is reduced to 1.0, whereas a ferrous-EDTA complex is found to be quite unstable at pH 1.8 and below. The recovery of EDTA from the solution of the ferric-EDTA complex was reduced by the fact that the complex would not precipitate and could not be recovered, and the reduction to give the unstable ferrous-EDTA complex increased the possibility of the EDTA recovery.

DEFINITION OF THE INVENTION

It is the principal objective of the present invention to provide a new process for the extraction of radium from uranium mill tailings permitting the extraction of higher proportions of the radium than appears to have been possible hitherto.

In accordance with the present invention there is provided a process for the extraction of radium from uranium mill tailings solids including the steps of contacting the tailings with a liquid leaching agent, leaching the tailings therewith, and subsequently separating the leachate liquid and the leached solids, wherein the leaching agent comprises:

(a) a complexing agent in an amount of from 2 to 10 times the stoichiometric amount needed to complex the metal ions to be removed thereby from the tailings; and (b) a reducing agent reducing the hydrolysable ions of the said metal ions to be removed to their lower oxidation states, the reducing agent being present in an amount from 2 to 10 times the stoichiometric amount needed for reducing the hydrolysable metals present in the tailings.

Also in accordance with the invention there is provided a process for the extraction of radium from uranium mill tailings solids including the steps of contacting the tailings with a liquid leaching agent, leaching the tailings therewith and subsequently separating the leachate liquid and the leached solids, wherein the leaching agent comprises:

(a) a complexing agent in an amount of from 2 to 10 times the stoichiometric amount needed to complex the metal ions to be removed thereby from the tailings;

(b) a reducing agent reducing the hydrolysable ions of the said metal ions to be removed to their lower oxidation states, the reducing agent being present in an amount from 2 to 10 times the stoichiometric amount needed for reducing the hydrolysable metals present in the tailings.

(c) a soluble alkali metal salt having a cation that will not complex with the complexing agent, the salt being present in an amount to give a concentration of from 0.01M to 1.0M in the leaching solution, the salt preferably adsorbing on adsorption sites of the tailings solids to render them non-available for radium adsorption.

Further in accordance with the invention there is provided a process for the extraction of radium from uranium mill tailings solids including the steps of contacting the tailings with a liquid leaching agent, leaching the tailings therewith and subsequently separating the leachate liquid and the leached solids, wherein the liquid leaching agent is first placed in a contacting vessel and agitated, and tailings solids to be leached are added at a slow uniform rate such that the entire mass of tailings solids is added over a period of from 20 to 30 minutes.

DESCRIPTION OF THE PREFERRED EMBODIMENTS

The processes of the invention have been applied particularly to tailings obtained from the sulfuric acid uranium milling operations carried out at the Quirke Mill of Rio Algom Ltd., Elliot Lake, Ontario, Canada. The tailings typically contain 326 pCi radium per gram of solids; 0.5% by weight of iron (present mostly in the form of jarosites and oxides); and nearly 85% by weight of silica. Much of the silica which initially in the ore was in the form of crystalline quartz is converted during the sulfuric acid leaching of uranium from the ore to high surface area amorphous or microcrystalline silica with high adsorptive capacity. In the tailings, radium is found to be present as a mixed precipitate with barium and lead sulfates, with jarosites, and adsorbed on silica and the metal oxides and hydroxides.

With all processes disclosed in the prior literature, a portion of the radium is found to resist dissolution in the leaching agent and is commonly referred to as the "unextractable fraction" of the radium. We have examined this problem and have proposed a model identifying the various forms in which the radium may be present in the tailings. According to this model the radium may occur in the following radium-retaining sites:

(a) deposited on the solid particles constituting the tailings in the form of a sulfate or carbonate coprecipitate, usually with heavy metal cations such as barium, lead or calcium;

(b) adsorbed as a cation on the finely divided silica, metal oxides, hydroxides, clays, etc. that are present;

(c) precipitated with mixed basic salts such as the jarosites; and (d) adsorbed and/or deposited in the pores of the particles.

The majority of the radium is found to be present as a sulfate coprecipitate (acid leach process) or as a carbonate coprecipitate (alkaline leach process). The present invention provides processes which permit radium extraction from the so-called "unextractable fraction".

Known leaching agents for sulfuric acid leach tailings are, for example, sodium citrate, sodium tartrate, nitrilotriacetic acid (NTA) and ethylenediamine tetraacetic acid (EDTA). Other more exotic complexing agents are known but generally are uneconomic; the effectiveness of EDTA is already well documented. Because radium is not a saleable commodity at present the process reagent costs need to be kept at a minimum for a radium-leaching process to be economic. EDTA therefore becomes a preferred choice, not only because of the lower quantities needed, but also because it can be easily recovered by precipitation for recycle, whereas the slightly cheaper citrates and tartrates are not easily recoverable for recycle.

In the processes of the invention a substantial excess of the complexing agent is required to ensure adequate extraction, and in particular the amount of the complexing agent should be from 2 to 10 times the stoichiometric amount needed to complex the metal ions that are to be removed thereby from the system.

Organic complexing compounds such as EDTA are effective in dissolving radium at high pH values, e.g. pH 10. At this alkalinity the ferric hydroxide and jarosites do not dissolve readily in the complexing agent due to the large value of the hydrolytic constant ($K_h$) of the ferric-ligand complex. We find that by the incorporation of a suitable reducing agent in the leach liquid, namely one capable of reducing to their lower oxidation states the hydrolysable ions of the metal ions that are removed by the complexing agent, in this embodiment one that will reduce the ferric ion to the ferrous state, the ferrous hydroxide dissolves instantaneously in the complexing agent due to a very low value of the ferrous-ligand hydrolytic constant. Similarly other radium adsorbing metal hydroxides such as that of titanium [Ti(IV)] dissolve in a complexing agent only when the metal is reduced to a lower oxidation state. Thus, the presence of a reducing agent in the leaching solution causes reduction of the metals to their lower oxidation states where their hydroxides dissolve readily in the presence of the complexing agent in the leaching solution. This results in the elimination of the metal hydroxide-adsorption-sites of radium and radium leaching is correspondingly improved.

In a laboratory example, 3 mmol of ferric ion (in the form of chloride) was added to 100 ml of an aqueous EDTA solution having therein 4 mmol of EDTA (EDTA concentration =0.04M) and the pH adjusted to 8 with NaOH; the resulting solution remained clear. This amount of EDTA was chosen since it was in the required excess of that needed to complex all the ferric ions. On the other hand when 3 mmol of ferric iron was precipitated first as ferric hydroxide, the precipitate added to 100 ml of 0.04M EDTA and the pH adjusted to 8, the precipitate did not dissolve completely even after the mixture was shaken for a few days. Upon addition of a few moles of the reducing agent sodium hydrosulfite to this latter mixture to reduce the Fe(III) to Fe(II) the precipitate dissolved readily in a few minutes. This is to be expected from the large difference in the stability between the Fe(III) - EDTA and Fe(II) - EDTA systems. Ti(IV) hydrated oxide behaved similarly except that the dissolution was slow. Jarosites were also dissolved in EDTA only when the reducing agent was added.

The process of the invention was applied to the sulfuric acid leached uranium mill tailings obtained from the Quirke Mill of Rio Algom Ltd., Elliot Lake, Ontario, Canada. The slurry samples were obtained from the last pachuca in the mill before any lime treatment for partial neutralization. This ensured the presence of minimal amounts of impurity metal ions like $Ca^{2+}$ which invariably aggravate the complexing agent requirements in such a treatment. The slurry was filtered and thoroughly washed with deionized water to remove the adhering acid. The wet cake (tailings) so obtained was air dried. The solids had a particle size of 48% passing through a 200 mesh (74 μm) screen, an average $^{226}Ra$ level of 326 pCi/g and a pyrite content of 5% by weight. The soluble metal ion content was nearly 0.05%–0.1% by weight.

After each leaching test, the leachate, the washings and the washed leach residues were analysed for radium-226 and in some cases for residual uranium in the solids. Uranium was analysed by delayed neutron counting and radium by gamma-ray spectroscopy. For the radium analyses, solid or liquid samples were wax-sealed in appropriate sample jars and stored for a minimum of 30 days to permit the decay daughter bismuth-214 to establish an equilibrium with radium-226. The gamma-ray spectra of the sample were then recorded using an Ortec ® coaxial Ge (Li) detector and a multichannel analyser tuned to the 609.4 keV photopeak of $^{214}Bi$. The analytical precision was ±5% over a 2000 second counting period.

To show the result of the absence of a reducing agent from the leach, one sample of 100 g of the tailings was added slowly in 200 ml of an aqueous solution containing only EDTA ($Na_2$) of 0.04M concentration, the pH having been raised to 10 by addition of sodium hydroxide. Leaching was done in a magnetically stirred covered beaker for 1 hour at room temperature. After 1 hour the slurry was filtered, the cake thoroughly washed and the leach-residue analysed for radium. It contained 80 pCi/g radium-226, showing a radium extraction efficiency of 75%.

A second sample of 100 g of the tailings was treated in exactly the same manner as described above, except that the radium leaching solution contained 0.04M of sodium hydrosulfite (reducing agent), 0.04M EDTA ($Na_2$)(complexing agent) and 1.0 M potassium chloride (an inorganic salt whose purpose will be described in more detail below). After leaching for 1 hour at room temperature the slurry was filtered and the cake was thoroughly washed with deionized water. The leach residues obtained from this test analyzed 31 pCi radium per gram of the solids, showing an extraction efficiency of 90%.

In order to test the process with ferric chloride leached tailings, a uranium ore sample obtained from Elliot Lake was treated in the laboratory with a 0.1M aqueous solution of ferric chloride to leach the uranium and radium therefrom. Due to the oxidation of pyrite (present in the ore) during this leaching, sulfate ions were generated and the radium was precipitated as sulfate. This ferric chloride leaching gave leach-residues containing radium in an amount of nearly 210 pCi radium per gram of solids, corresponding to an extraction efficiency of only 35%. A radium leaching reagent mixture of the invention comprising a reducing agent, a complexing agent and an inorganic salt was employed, 100 g of these tailings being added slowly to 200 ml of the leaching solution which comprised 0.04M EDTA ($Na_2$) and 1.0M potassium chloride at a pH of 10. The leaching was done for 1 hour at room temperature in a magnetically agitated covered beaker and the pH was maintained at 10 during leaching. After 1 hour, the slurry was filtered and the cake was thoroughly washed with deionized water; the leach-residue thus obtained was dried and analyzed for radium and was found to contain 29 pCi radium per gram of solids, for an extraction efficiency of 91% for the combined processes of ferric chloride leaching and the present invention.

Similar tests were carried out using sodium citrate, sodium tartrate and NTA as the complexing agent and the results are given in Table I below.

TABLE I

EFFECT OF COMPLEXING AGENT COMPOSITION ON $^{226}Ra$ LEACHING

| Time: | 1 hour |
|---|---|
| pH: | 10 |
| L/S Ratio: | 2.0 ml/g |
| Composition: | 0.04 M $Na_2S_2O_4$, 1 M KCl [Complexing agent] variable |

| Concentration of Complexing Agent (M) | Radium-226 in Leach Residues (pCi/g) | | | |
|---|---|---|---|---|
| | Sodium Citrate | Sodium Tartrate | NTA | EDTA |
| 1.0 | 62 | 68 | — | — |
| 0.5 | 82 | — | — | — |
| 0.1 | 108 | 120 | 48 | — |
| 0.04 | 210 | 247 | — | 44 |

Note that (—) signifies that no experiment was done.

It is evident that, as compared to EDTA, sodium citrate and sodium tartrate both are poor radium leachants even at a concentration of 1.0M. Although NTA gives good radium extraction, yet EDTA is by far the most effective leachant even at a low concentration of 0.04M. This is because the formation constant (log K) for the Ra-ligand complex is very high in the case of EDTA (7.12) as compared to those for NTA (5.75), citric acid (2.35) and tartaric acid (1.24).

Sodium hydrosulfite is found to be an effective reducing agent in the complexing system employed. Other suitable reducing agents are for example sulfur dioxide, sodium sulfite and hydrogen produced by electroysis.

Although silica retains negligible quantities of radium at pH values around 1.0, as noted above, it is known to be an effective cation adsorber at pH values higher than 3.0, as noted on page 175 of the book entitled "Handbook of Silica Flotation" by R. M. Manser published by Warren Spring Laboratories, Stevenage, U.K. In the sulfuric acid leaching of uranium from ore, silica provides a large surface for the deposition of radium sulfate precipitates. When this type of surface is treated with an organic complexing agent to leach radium, at a pH of around 10, the radium leaching phenomenon becomes complex because the complexing agent easily breaks the radium sulfate and radium is dissolved, but at the same time the silica surface at that alkalinity also offers excellent adsorption sites for the $Ra^{2+}$ ions in solution.

Thus, during radium leaching from tailings with alkaline solutions of organic complexing agents, crystalline silica is converted to high surface area amorphous silica which readily adsorbs cations such as radium. The adsorption of cations on the silica surface is proportional to the magnitude of the surface charge on the silica. At alkaline pH values this is always highly negative, and thus the silica surface behaves as an efficient adsorbent for the cations. This adsorption phenomenon inhibits efficient removal of radium from mill tailings by alkaline leaching solutions containing organic complexing agents. In the practice of this invention the adsorption sites on the silica surface are continuously masked by preferentially adsorbing cations other than radium, and the radium retention by the silica surface is thereby reduced and the radium leaching improved. Thus, in accordance with the invention inorganic salts containing cations that do not complex, or only weakly complex, with the organic complexing agent are added to the solution of the agent, these salts providing the desired cations that preferentially adsorb on the silica adsorption sites and render them non-available for any radium adsorption. The inorganic salts of alkali metals such as sodium, potassium and cesium and the ammonium salts are most useful in this respect. The cations such as $Na^+$, $K^+$, $Cs^+$ and $NH_4^+$ preferentially adsorb on the silica surface when their concentration in the leaching solution is kept high as compared to that of $Ra^{+2}$. This is the purpose of the inclusion of the alkali metal salt in the leach liquids of the experiments described above. In order to avoid complication in language the claims herein recite that the cation of the soluble alkali metal salt is not to complex with the complexing agent. For commercial practice it may be permissible for weak complexing to take place, since the only effect will be the loss of a quantity of the complexing agent, and this may be offset by other economic factors.

In an experiment performed to demonstrate this effect apart from the use of the reducing agent, 100 g of crystalline quartz were firstly finely ground to below 200 mesh (74 μm). The ground mass was then washed with 200 ml of a 0.1M aqueous solution of hydrochloric acid to remove any acid-soluble metal salt impurities, and then thoroughly washed with deionized water to remove the acid. The washed solids were air dried and then digested in a conical flask with 100 ml of 1.0M sulfuric acid solution for 36 hours. The flask was agitated with a spin bar and heated in a water bath maintained at 80° C. by heating on a magnetic hot plate stirrer. At the start of digestion a total of 30,000 pCi of radium-226 were added slowly and dropwise from a standard solution of radium chloride. This quantity ensured that the solids would contain 300 pCi radium per gram of the solids distributed uniformly in the solids. This digestion treatment was given in order to simulate the sulfuric acid leaching of uranium ores. After digestion the slurry was cooled, filtered and thoroughly washed with deionized water to remove the acid. The washed solids were dried. Radium was leached from this silica as follows:

(a) 40 g of the above treated quartz was added slowly to 80 ml of 0.04M aqueous solution of EDTA ($Na_2$) and leached for 1 hour at room temperature. During leaching the pH of the contents was maintained at 10 with sodium hydroxide. After leaching the slurry was filtered and thoroughly washed with deionized water. The washed solids were dried and then analyzed for radium. The leach residue was found to contain 71 pCi radium per gram of solids, showing a removal efficency of 76%.

(b) A second batch of 40 g of the treated quartz was added slowly to 80 ml of an aqueous solution which contained the same amount of EDTA ($Na_2$), but which also contained 5.96 g of potassium chloride (KCl), giving a concentration of 1.0M for KCl in the solution. The same leaching method was employed and the leach residue from this test analysed 31 pCi radium per gram of solids, showing a removal efficiency of 90%. These results indicate that the $K^+$ ions are providing effective masking of the cation adsorption sites of the silica surface and radium leaching by the EDTA is correspondingly improved. It is found that the amount required for the metal salt is that which will give a concentration of from 0.01M to 1.0M in the leaching solution.

The maintenance of a large liquid to solid ratio during leaching is always helpful in improving the leaching. However, in a commercial plant the use of a high liquid to solid ratio results in the need for larger equipment and larger amounts of the solutions to handle, which increases the capital and operating costs. Liquid to solid ratios should therefore be kept as low as possible, consistent with acceptable leaching performance. In operating the processes of the invention the leaching solution is first added to the reaction vessel and agitation is started. The solids are then added slowly rather than all at once, so that the initially added solids are leached effectively at a liquid to solid ratio approaching infinity and also at all times the solids are leached at a larger liquid to solid ratio than the final one, leading to improved leaching. The method therefore is able to employ lower nominal liquid to solid ratios, but is equivalent to leaching at a higher liquid to solid ratio.

This procedure is illustrated by the following experiments performed at a nominal L/S ratio of 2 ml/g. In each experiment, Elliot Lake uranium mill tailings were treated with a leaching solution for 1 hour at room temperature, the solution having 0.04M each of sodium hydrosulfite and EDTA ($Na_2$), and 1M of potassium chloride. 100 g of the tailings were treated with 200 ml of the leaching solution and the pH was maintained at 10. In a first experiment, 100 g of the tailings were added "en bloc" to 200 ml of the solution. In a second experiment, 200 ml of the leaching solution were first placed in the beaker and agitation started with the spin bar; to this solution 100 g of the tailings were added slowly over a 20 minute period at a rate of 5 g solids per minute. The total leaching time was kept at 1 hour including the time for solids addition. The radium content of the leach residues from the first test was found to be 44 pCi/g, while the residues from the second test contained 31 pCi/g. This method of solid/liquid contacting therefore improves the radium leaching by nearly 12 pCi/g and gives tailings with nearly 27% less residual radium.

In third and fourth experiments two more samples of 60 g each of the tailings were treated, adding the solids slowly to the leaching solution over a 20 minute period, the leaching time being maintained at 1 hour. The third experiment employed a liquid/solid ratio of 2, while the fourth experiment employed a ratio of 15.

After leaching with the reducing-complexing mixture, the wet cake of the first two experiments was washed with water adjusted to pH 10 with NaOH. The filtrate and washings were analysed for radium; the leaching at L/S 2 was found to have achieved 88% extraction, while L/S 15 gave 92% extraction. The washed cake was then repulped with 100 ml hydrochloric acid, leached for an additional ½ hour in the acid, filtered and then washed. The acid filtrate was found to contain an additional 0.9% radium at L/S 2 and 0.11% at L/S 15. This repulping of the wet cake, leaching and washing procedure were repeated with 100 ml acidic aqueous solutions of calcium chloride and potassium chloride; the objective of these repulping treatments was to determine if any additional amounts of radium will be leached from the solids after the reducing-complexing treatment. The filtrates from the calcium chloride leach contained 1.6% of the radium at L/S 2 and 0.06% of the radium at L/S 15, while those from the potassium chloride leach did not show detectable amounts. The radium content of the leach residue from the L/S 2 experiment was 30.9 pCi/g while that from the L/S 15 experiment was 25.9 pCi/g.

These results indicate that:

(i) The extraction of radium from the tailings by the reducing-complexing process is high (90%) as compared to that obtained with EDTA ($Na_2$) alone, where only 75% radium extraction is achieved.

(ii) Due to the new method of slowly adding the solids to the leachant solution, increasing the liquid/solid ratio does not seem to have sufficiently significant effect on the percentage leaching of radium to justify it, and by using this method low liquid to solid ratios may be maintained in a plant, giving capital and operating costs savings.

(iii) The reducing-complexing process is so effective that negligible amounts of radium are additionally leached when the leach-residues from this process are further leached sequentially with HCl, $CaCl_2$ and KCl.

The processes of the invention will result in EDTA solutions of higher radium content than attainable by prior methods, and also containing strongly complexed metal cations and Fe(III) etc. The recovery of the EDTA is important for economic reasons and the freeing of the solutions for this purpose is essential. Removal of radium from solutions of EDTA by ion-exchange (at pH 6–7) as well as by precipitation of $BaRaSO_4$ (at pH 4) are both very well known and many processes based on these two methods were commissioned in the 1930's. These processes have been thoroughly reviewed in Gmelin's handbook, Radium, Vol. 2, System No. 31, pages 134–165, Springer Verlag (1977). Bhat et al. proposed in the Indian Journal of Chemistry (1964), pages 105–107 in an article entitled "Recovery of Metal and EDTA Contents from Metal-EDTA Solutions" a method whereby Fe(III) is removed from EDTA solutions by adding lime to precipitate $Fe(OH)_3$. These workers presented a detailed theoretical as well as experimental account of the EDTA recovery. According to their method, heavy metals such as Fe(III) and CU(II) are first precipitated by adding lime, the slurry is filtered and then EDTA is precipitated by acidifying the solution to a pH of 1.8, under constant agitation for nearly 5 hours. They reported that the EDTA precipitation is improved by keeping the temperature low and leaving the precipitate and the liquor stationary for 48 hours after the precipitation is completed. Later Nixon et al. in the article referred to above adopted essentially the same process for the removal of Fe(III) and other heavy metals, using ion exchange resins for purification of the radium. Starostin et al in the article referred to above reported that the EDTA bound to Fe(III) may also be freed by reducing the Fe(III) to Fe(II). We recommend the procedures reported in Gmelin and by Bhat et al for the removal of radium by precipitation as $BaRaSO_4$ and for the recovery of EDTA for recycle respectively. Since radium is not a commercial commodity to be recovered in a pure form, the expensive and tedious ion-exchange removal for this operation as proposed by Nixon et al is unjustified commercially. Since a reducing agent is already used in the leaching stage, Fe stays as Fe(II) at all times and the problems of separating EDTA from the stable Fe(III) - EDTA complex do not exist in the leachates obtained in the processes of the invention.

The scheme for radium removal from the leachate and EDTA recovery tested by us is as follows. The solution at PH 10 was reduced to pH 3.8 at room temperature (20° C.) by addition of sulfuric acid. Aqueous barium chloride solution was added gradually and stirred for 1 hour to result in $BaRaSO_4$ precipitation as a slurry. This was allowed to settle for 24 hours and then filtered through a silica bed and washed to result in a $BaRaSO_4$ sludge. The resultant clear filtrate contained no detectable radium. The EDTA was now precipitated from the filtrate by reduction of the pH to 1.8 with sulfuric acid at reduced temperature (11° C.). The solution was stirred for 1 hour, settled for 48 hours at 11° C., filtered and washed and the recovered EDTA (92.3% wt) dried. It may be noted that in this scheme there is no need to increase the pH from 10 to 12 to precipitate the heavy metals and Fe(III), then reduce it to 7 for the ion-exchange removal of radium and then reduce it again to 1.8 for the precipitation of the EDTA. Also, this scheme does not involve additions of any hydrochloric acid. Throughout the process cheaply available sulfuric acid is employed and nearly 92 wt % of EDTA is recovered for recycle.

The processes of the invention yield environmentally acceptable uranium mill tailings and can be incorporated in an existing milling operation. Since 92 wt % of the EDTA can be recovered and recycled, the reagent consumption is reduced. The method of adding the solids slowly to the leaching solution permits use of low liquid/solid ratios without grossly affecting the radium leaching efficiency. The leach-residues obtained are sufficiently low in radium that they can be surface disposed, or can advantageously be employed for mine backfill. However, for the latter application the pyrite and the fines would have to be separated first by flotation and size separation respectively. The employment of this process in an existing mill will remove the need for perpetually maintained Tailings Management Areas. The processes of the invention can also be applied to remove radium from existing tailings, but larger quantities of the complexing agent would be needed because of the presence of large amounts of calcium that were added for neutralization. This is not a great disadvantage in view of the efficient recovery of the complexing agent for recycle and the potential savings in the costs of tailings management.

We claim:

1. In a process for the extraction of radium from uranium mill tailings solids including the steps of contacting the tailings with a liquid leaching agent, leaching the tailings therewith and subsequently separating the leachate liquid and the leached solids, the improvement wherein the leaching agent comprises (a) a complexing agent in an amount of from 2 to 10 times the stoichiometric amount needed to complex the metal ions to be removed thereby from the tailings; and (b) a reducing agent reducing the hydrolysable ions of the said metal ions to be removed to their lower oxidation states, the reduction agent being present in an amount from 2 to 10 times the stoichiometric amount needed for reducing the hydrolysable metals present in the tailings.

2. The invention as claimed in claim 1, wherein the complexing agent is EDTA in a concentration from 0.01M to 0.1M and the reducing agent is sodium hydrosulfite in the same concentration as the EDTA.

3. The invention as claimed in claim 1, wherein the liquid leaching agent comprises a soluble alkali metal salt having a cation that will not complex, or that will complex only weakly, with the complexing agent, the salt being present in an amount to give a concentration of from 0.01M to 1.0M in the leaching solution, the salt preferably adsorbing on adsorption sites of the tailings solids to render them non-availalle for radium adsorption.

4. The invention as claimed in claim 1, wherein the liquid leaching agent is first placed in a contacting vessel and agitated, and tailings solids to be leached are added at a slow uniform rate.

5. In a process for the extraction of radium from uranium mill tailings solids including the steps of contacting the tailings with a liquid leaching agent, leaching the tailings therewith and subsequently separating the leachate liquid and the leached solids, the improvement wherein the leaching agent comprises (a) a complexing agent in an amount of from 2 to 10 times the stoichiometric amount needed to complex the metal ions to be removed thereby from the tailings;
(b) a reducing agent reducing the hydrolysable ions of the said metal ions to be removed to their lower oxidation states, the reducing agent being present in an amount from 2 to 10 times the stoichiometric amount needed for reducing the hydrolysable metals present in the tailings; and
(c) a soluble alkali metal salt having a cation that will not complex with the complexing agent, the salt being present in an amount to give a concentration of from 0.01M to 1.0M in the leaching solution, the salt preferably adsorbing on adsorption sites of the tailings solids to render them non-available for radium adsorption.

6. The invention as claimed in claim 4, wherein the entire mass of tailings solids is added over a period of from 20 to 30 minutes.

* * * * *